United States Patent [19]
Lewis

[11] 3,975,580
[45] Aug. 17, 1976

[54] ARTICULATED CROSSARM ASSEMBLY FOR ELECTRICAL CONDUCTOR SUPPORT STRUCTURE

[75] Inventor: Paul E. Lewis, Mexico, Mo.

[73] Assignee: A. B. Chance Company, Centralia, Mo.

[22] Filed: May 8, 1975

[21] Appl. No.: 575,828

[52] U.S. Cl. .............................. 174/45 R; 52/697; 248/221 A; 248/221 C
[51] Int. Cl.² .................. H02G 7/20; E04H 12/24
[58] Field of Search ............ 174/45 R, 148, 149 R, 174/158 R, 161 R; 52/28, 40, 697, 721; 248/65, 221 R, 221 A, 221 C, 282, 284; 403/122

[56] References Cited
UNITED STATES PATENTS

| | | | |
|---|---|---|---|
| 1,754,082 | 4/1930 | Chase | 248/221 A |
| 2,689,104 | 9/1954 | Pfaff, Jr. | 248/221 A X |
| 3,342,925 | 9/1967 | Lewis et al. | 174/45 R |
| 3,580,534 | 5/1971 | Lindsey | 174/45 R X |

FOREIGN PATENTS OR APPLICATIONS

| | | | |
|---|---|---|---|
| 374,235 | 4/1923 | Germany | 174/45 R |
| 447,321 | 7/1927 | Germany | 697/ |
| 596,177 | 4/1934 | Germany | 174/148 |
| 913,555 | 6/1954 | Germany | 174/45 R |

Primary Examiner—Laramie E. Askin
Attorney, Agent, or Firm—Schmidt, Johnson, Hovey & Williams

[57] ABSTRACT

A self-aligning articulated crossarm assembly for supporting electrical transmission lines is provided which utilizes unique mounting structure for insuring that the assembly assumes a true perpendicular orientation with respect to the supported line even in the event that the mounting holes therefor in the pole are off-center or otherwise out of alignment. Ball and socket mounting of the horizontal support arms of the assembly in conjunction with multi-clevis coupling of the strain member thereof between the horizontal arms and pole permits use of the assembly on irregular poles or the like without the necessity of precisely boring the mounting holes for the assembly. In preferred forms, the ball sockets for the support arms have open bottoms so that upon failure of the strain member the arms can swing downwardly while remaining operatively secured to the pole with the line still supported above-grade.

11 Claims, 8 Drawing Figures

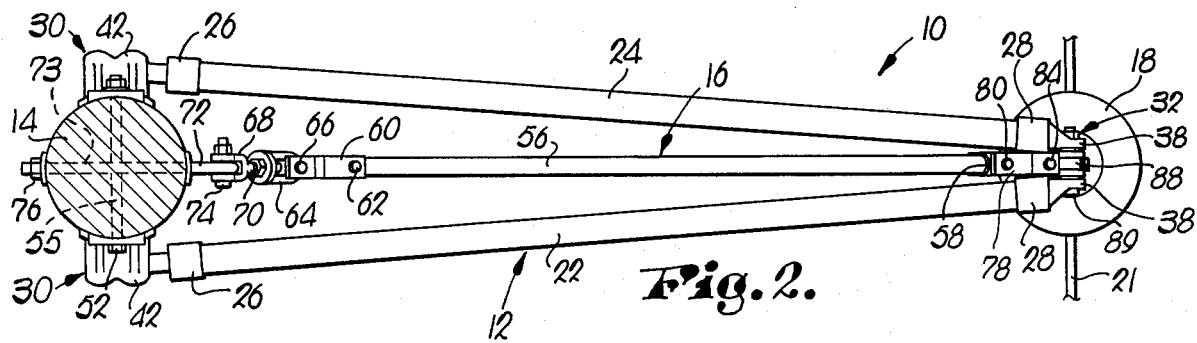
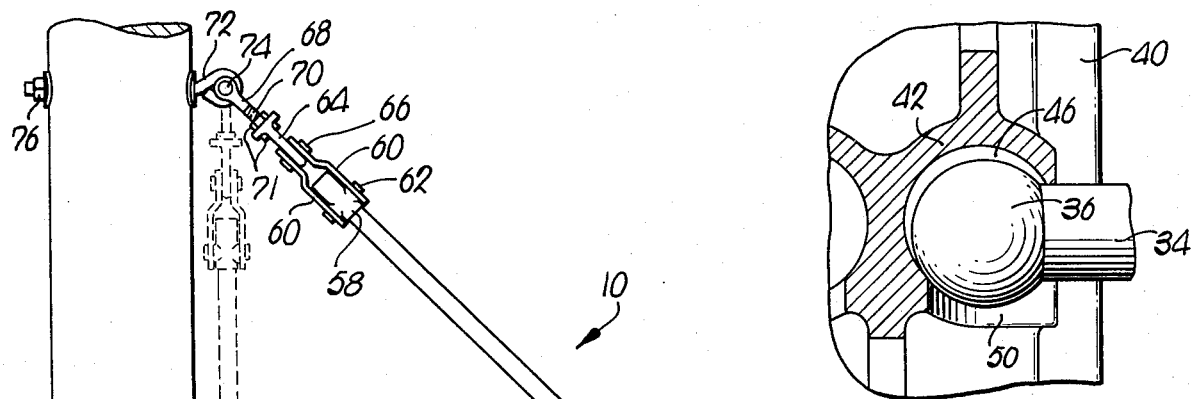
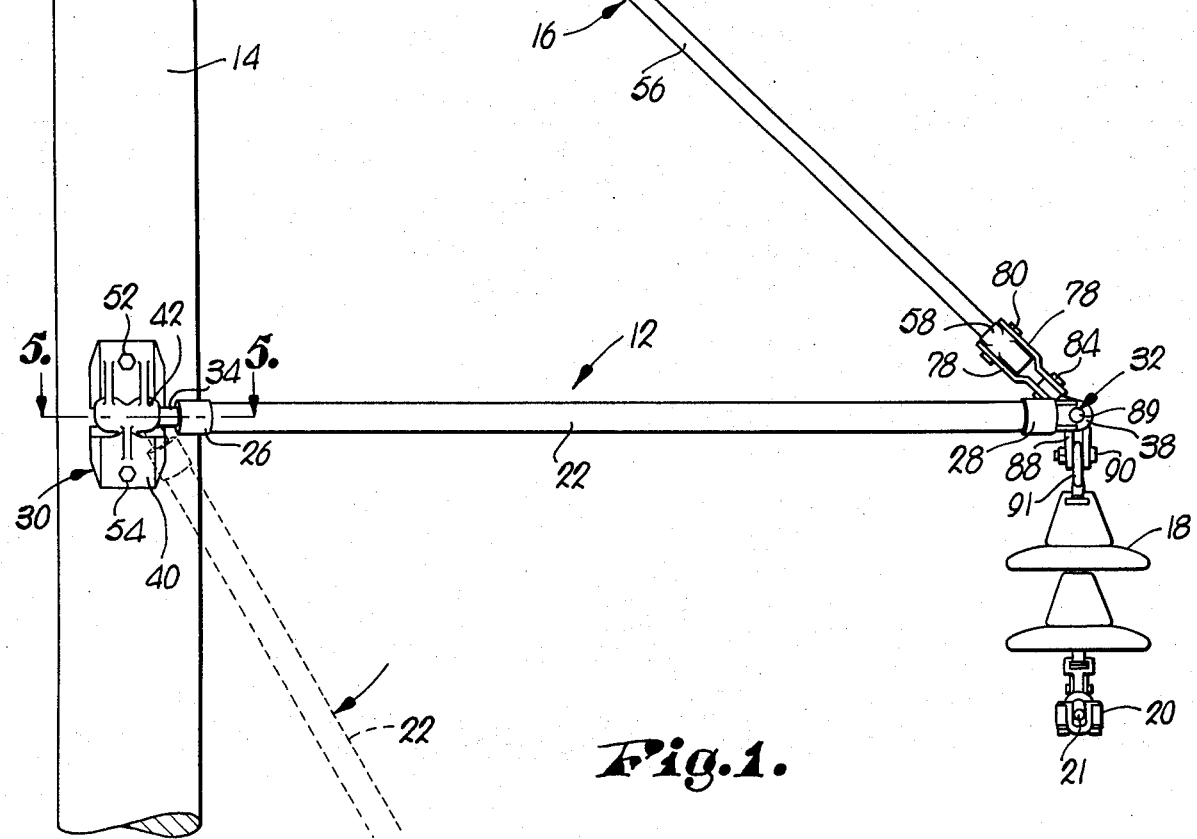

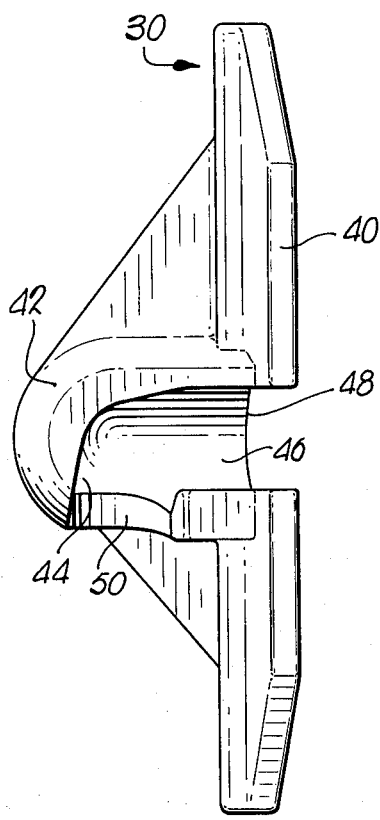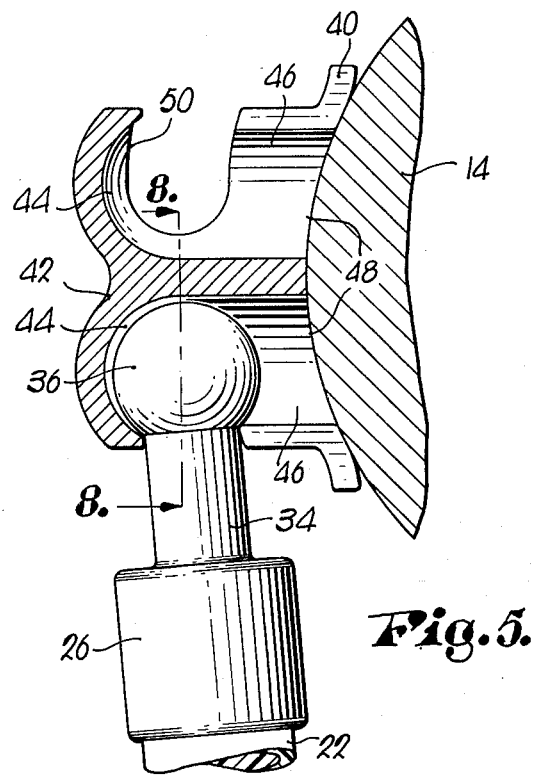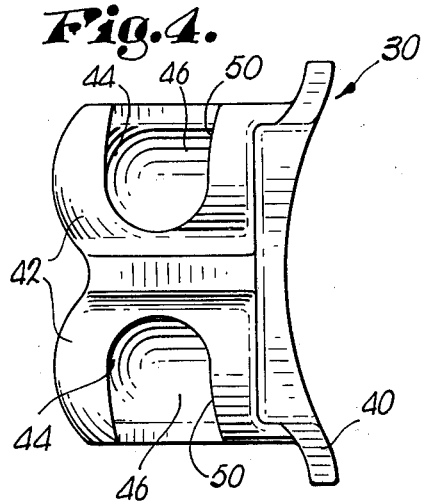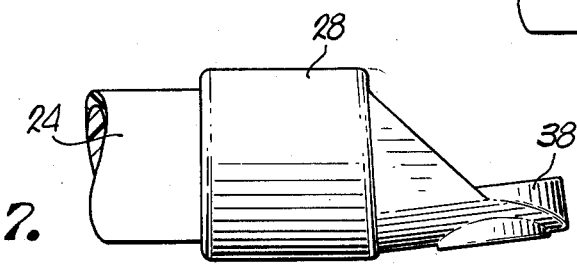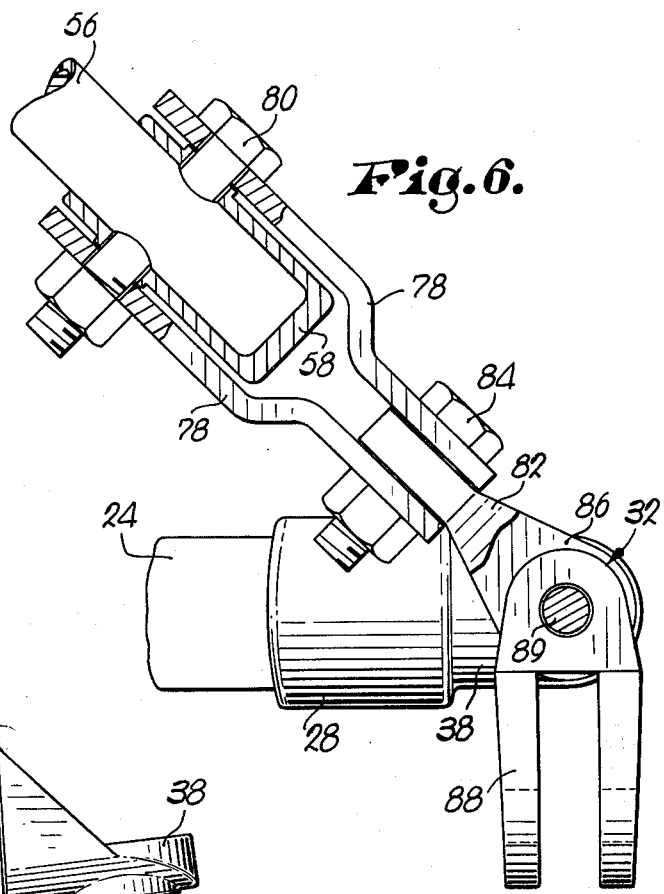

ARTICULATED CROSSARM ASSEMBLY FOR ELECTRICAL CONDUCTOR SUPPORT STRUCTURE

This invention relates to crossarm assemblies adapted to be secured to upright poles for supporting electrical transmission conductors. More particularly, it is concerned with self-aligning assemblies which can be mounted on irregular wooden poles without the necessity for precisely aligning and boring the mounting holes therefor; provision of ball and socket mounting structure for the horizontal support arms, along with clevis mounting of the strain member, insures that the assembly can compensate for mounting errors without fear of deleteriously affecting the performance of the assembly.

For a number of years electrical utilities and others have made use of insulative crossarm assemblies for supporting electrical transmission lines and the like. In many cases such assemblies formed of fiber glass reinforced, synthetic resin materials have replaced conventional wooden crossarms by virtue of the superior insulating and strength qualities, thereof, as well as for aesthetic reasons. One type of assembly which has heretofore found wide acceptance in the art is disclosed in U.S. Letters Patent No. 3,342,925. This assembly employs a pair of juxtaposed, generally horizontal mounting arms mounted to an upright utility pole in conjunction with an obliquely oriented strain member joined to the support arms at the outer end thereof and also to the pole above the arm connections. In addition, the support arms are secured to the pole by means of clevis structure whereby the separate arms can pivot about upright axes parallel with the pole itself.

Other types of crossarm assemblies have also been proposed, and these have found some degree of acceptance in the art. However, some of these prior crossarm assemblies have been deficient in a number of respects. Specifically, in order to avoid unnatural bending or twisting loads upon the assemblies under ambient wind loads and the like it is essential that the assemblies be mounted so that the longitudinal axis of the supported conductor is almost precisely perpendicular to the pole mounted crossarm assembly. As can be appreciated, on tapered or otherwise irregular wooden poles, this type of precise mounting can be very difficult to achieve. As a consequence, the assembly may be subjected to unnatural bending or twisting loads which can lead to premature failure thereof. Moreover, the probability of failure in such situations is greatly compounded during high wind or other adverse weather conditions when the assembly is subjected to even greater stresses than during normal weather.

In addition, upon failure of the prior crossarm assemblies, there is generally no provision for ensuring that the energized conductor is maintained above grade. This is of course detrimental in that the line may fall to the ground where it can become a potential hazard to passersby or others in the vicinity of the pole.

It is therefore the most important object of the present invention to provide an articulated crossarm assembly for supporting electrical transmission lines which utilizes novel mounting structure permitting the assembly to self-align in a truly perpendicular orientation relative to the supported line, notwithstanding the fact that the assembly can be mounted on an irregular wooden pole and without the necessity of precise mounting holes therefor; the assembly can thus be easily and quickly installed in the field without fear that improperly oriented mounting holes could cause the overall assembly to prematurely fail by virtue of unnatural bending or twisting loads imposed thereon.

Another object of the invention is to provide a crossarm assembly utilizing ball and socket mounting structure for the horizontal support members thereof, along with multi-clevis coupling of the oblique strain member supporting the arms in order that compensation is provided for potentially improper mounting to assure truly perpendicular alignment of the assembly with respect to the supported conductor.

As a corollary to the foregoing object, it is also an object of the invention to provide clevis mounting structure for the strain member permitting selective variation of the length thereof so that the assembly can be properly mounted on a tapered or otherwise irregular wooden pole, with the clevis mounting also permitting limited pivoting of the strain member about separate, relatively perpendicular axes both of which are transverse of the longitudinal axis of the strain member.

A still further object of the invention is to provide ball and socket mounting structure for the generally horizontal support arms of the assembly wherein the undersides of the socket-defining mounting structures are relieved to permit the support arms to swing downwardly in the event of failure of the strain member while nevertheless maintaining the attachment of the arms to the pole with consequent above-grade support of the conductor.

In the drawings:

FIG. 1 is a side elevational view of the crossarm assembly of the present invention shown operatively mounted on an upright utility pole, with the operation of the assembly upon failure of the strain member thereof shown in phantom;

FIG. 2 is a top plan view of the assembly illustrated in FIG. 1;

FIG. 3 is a side elevational view of the socket-defining mounting structure adapted to be secured to an upright utility pole for mounting the horizontal support arms of the assembly;

FIG. 4 is a bottom plan view of the socket-defining mounting structure illustrated in FIG. 3;

FIG. 5 is an enlarged, fragmentary, partial sectional view taken along line 5—5 of FIG. 1 and illustrating in detail the ball and socket-mounting of the horizontal support arms;

FIG. 6 is an enlarged, fragmentary view in partial vertical section depicting the interconnection between the horizontal support arms and strain member;

FIG. 7 is an enlarged, fragmentary, side elevational view of the outer end of a horizontal support arm adapted for interconnection with an adjacent arm and a strain member; and FIG. 8 is a sectional view taken along line 8—8 of FIG. 5 and further illustrating the ball and socket-mounting structure of the horizontal support arms.

An articulated crossarm assembly 10 in accordance with the invention is illustrated in FIG. 1 in its environment of use. Assembly 10 broadly comprises elongated, two-piece, generally horizontal support arm-defining means 12 extending outwardly from an upright utility pole 14, in conjunction with an obliquely oriented support rod 16 which is connected at respective ends thereof to pole 14 and the outermost end of arm-defining means 12. An insulator string 18 is suspended from the outermost end of arm-defining means 12 and has conventional clamp means 20 thereon for supporting an elongated conductor 21 or the like.

Arm-defining means 12 includes a pair of juxtaposed, reinforced fiber glass insulative arms 22 and 24 which lie in a common plane generally perpendicular to the longitudinal axis of pole 14. Each arm 22 and 24 includes an integrally attached ball ferrule 26 at the innermost end thereof, and an apertured connection ferrule 28 at the outermost end thereof. As best shown in FIG. 2, each of the respective ball ferrules 26 of arms 22 and 24 is received within socket-defining mounting structure 30 attached to generally opposed faces of pole 14, and the arms are interconnected at their outermost ends thereof by connective means 32.

Each ball ferrule 26 includes an elongated, axially aligned, shaft-like extension 34 having a substantially spherical ball 36 connected to the outermost end thereof. Each connection ferrule 28 is provided with a somewhat angularly oriented, apertured extension 38 which is adapted to mate with the outer end of support rod 16 and the extension 38 of the remaining arm to permit interconnection of such components as will be described.

Each socket-defining mounting structure 30 (see FIGS. 3 and 4) comprises an elongated, apertured mounting plate 40 having a gently arcuate inner surface configured to conform to the exterior face of pole 14. A pair of opposed, identical, oppositely opening protruding socket-defining structures 42 are centrally disposed on the outer face of plate 40 for mounting a pair of oppositely extending assemblies to pole 14. Each socket-defining structure 42 includes an outermost, rounded ball-receiving cavity 44 which communicates with an elongated, laterally extending channel section 46 which is open along the length thereof. Section 46 in turn communicates with a generally circular opening 48 provided in the inner face of plate 40. In addition, the normal undersides of each of the socket-defining structures 42 are open as at 50 which is important for purposes to be made clear hereinafter. As best shown in FIGS. 1 and 2, a pair of elongated bolt assemblies 52 and 54 extend through a pair of parallel, vertically spaced holes 55 provided in pole 14 for the purpose of mounting the respective socket-defining structures 30 on substantially opposed faces of the pole. As is also apparent from FIGS. 5 and 8 of the drawings, the respective balls 36 of ferrules 26 are configured to be relatively loosely received within corresponding socket-defining structures 42 and be captured therein with extensions 34 extending out the open lateral face of the structures 42. In this regard it is not necessary that the balls 36 and structures 42 be precisely machined to assure a tight complemental fit therebetween; to the contrary, these components can be cast and finished without great care being taken relative to the precise configurations thereof as long as the purposes of the present invention are served. This feature of course minimizes production costs associated with assembly 10. In addition, it will be clear that the ball and socket mounting structure hereof could be reversed, i.e., the ball portions could be affixed to the pole with the sockets secured to the inner ends of the arms.

Support rod 16 is an elongated, insulative strain member 56 preferably formed of reinforced fiber glass and having a pair of identical, apertured ferrule caps 58 on opposed ends thereof. Referring specifically to the upper end of strain member 56, it will be seen that a pair of elongated mounting sections 60 are releasably secured to ferrule 58 by means of bolt means 62. A clevis eye 64 is sandwiched between the ends of mounting sections 60 remote from member 56, with a clevis bolt 66 extending through the sections 60 and eye 64. Yoke structure 68 is provided which includes a threaded lowermost shank 70 which is threaded into nuts 71 provided on each side of the bored free end of clevis eye 64, and yoke structure 68 in turn is connected to an elongated eyebolt 72 by means of connecting clevis bolt 74. Eyebolt 72 extends through hole 73 provided in pole 14 above holes 55 and is secured thereto by means of a nut 76. Thus, it will be seen that member 56 can pivot to limited degrees about respective pivot axes defined by clevis bolts 66 and 74, both of such axes being substantially perpendicular with respect to the longitudinal axis of member 56. Such limited pivoting allows member 56 to compensate for improper mounting thereof and also to shift slightly as needed during high wind load conditions and the like.

A pair of apertured, identical mounting sections 78 are connected to ferrule cap 58 on the lowermost end of strain member 56 by means of bolt means 80. In this instance however, (see FIG. 6) mounting sections 78 are connected at the lowermost ends thereof to an apertured mounting shank 82 by means of bolt 84. Shank 82 includes an apertured, bifurcated, yoke-defining section 86 at the lower end thereof which receives a depending apertured hanger 88. Bolt means 89 extends through each extension 38 of the respective arms 22 and 24, as well as through bifurcated section 86 and hanger 88 (FIG. 6) and releasably secures these components together. As shown in FIG. 1, hanger 88 is operable to support eye 91 through the use of bolt 90, with eye 91 in turn supporting insulator string 18.

During installation of assembly 10, the inner ends of the respective arms 22 and 24 are inserted within corresponding mounting structures 30 by positioning the balls 36 of ferrules 26 within the socket-defining structures 42 of the separate mounting structures 30. At this point, mounting structures 30 can be secured to substantially opposed faces of pole 14 through the use of bolts 52 and 54 which extend through previously prepared holes 55. Similarly, strain member 56 is secured to pole 14 by means of eyebolt 72 extending through hole 73, clevis eye 64, and mounting sections 60. At this point, arms 22 and 24 are shifted upwardly to their generally horizontal work positions whereupon the arms and strain member 56 are interconnected together by means of the connective assembly 32 described hereinabove. In this respect it is important to note that the mounting holes provided in pole 14 need not be precisely perpendicular relative to one another as has been the case with prior articulated crossarm assemblies. In the event that the mounting holes are non-perpendicular, off-center, or otherwise misaligned, the relatively loose fit between balls 36 and socket-defining structures 42 permits gravity-induced compensatory adjustment of the arms 22 and 24. Similarly, the multi-clevis attachment of strain member 56 to pole 14 assures that the strain member will assume the proper perpendicular orientation with respect to arms 22 and 24 and line 21.

Assembly 10 can therefore be affixed to pole 14 without great care being taken to assure that the mounting holes therefor are truly perpendicular. The inherent adjustability of assembly 10 insures that it will assume a truly perpendicular orientation relative to supported conductor 21 so that the assembly will not be subjected to unnatural bending or twisting loads by virtue of improper mounting. Furthermore, should pole 14 be somewhat tapered, as is common with wooden poles, the desired vertical length of strain member 56 can be achieved by adjusting yoke structure 68 into clevis eye 64 the required amount.

Furthermore, in the event that strain member 56 fails during operation of assembly 10, the arms 22 and 24 can swing downwardly as illustrated in phantom in FIG. 1 and remain operative to cooperatively support line 21. By virtue of the fact that the undersides of the respective socket-defining structures 42 are open as at 50, no interference is presented for extensions 34 of ferrules 26. Hence, the arms 22 and 24 are free to swing downwardly, but nevertheless remain securely captured within the corresponding socket-defining structures 42. This in turn assures that the supported conductor will not be allowed to drop to ground level since the conductor is still supported adjacent the outermost ends of the arms 22 and 24.

It will thus be appreciated that a self-adjusting, articulated crossarm assembly is provided which obviates many of the problems associated with crossarm assemblies of this type and permits easy and quick installation in the field without the need for careful alignment and boring of the mounting holes therefor, as has heretofore been required.

Having thus described the invention, what is claimed as new and desired to be secured by letters patent is:

1. A crossarm assembly adapted to be mounted on an upright pole for supporting an elongated line therefrom, said assembly comprising:
   elongated arm-defining means having an inner end and an outer end;
   means on said arm-defining means for supporting said line;
   mounting means for attaching the inner end of said arm-defining means to said pole and comprising separate, complemental attachment structures respectively secured adjacent said inner end and adapted to be affixed to said pole,
   one of said attachment structures including hollow socket-defining structure having at least a portion of the normal underside thereof open,
   the other of said attachment structures including attachment means complementally received within said socket-defining structure;
   elongated support means secured to said arm-defining means and adapted to extend toward said pole; and
   means for attaching said support means to said pole, said socket-defining structure and attachment means being cooperatively configured for relative movement therebetween during both the installation and use of said assembly on said pole as a support for said line in order to allow the assembly to initially orient itself as needed for supporting said line without creation of significant bending loads thereon, and for allowing said arm-defining means to swing downwardly upon failure of said support means with the attachment means remaining within said socket-defining structure and the opening in the underside of the latter accommodating said downward swinging.

2. The crossarm assembly of claim 1, wherein said one attachment structure is adapted to be secured to said pole, with the other of said attachment structures being secured to the inner end of said arm-defining means.

3. The crossarm assembly of claim 2 wherein said arm-defining means comprises a pair of juxtaposed arms for extending outwardly from said pole and interconnected adjacent the outermost ends thereof, said mounting means including separate socket-defining structures for each arm respectively and adapted to be secured to said pole, each of said socket-defining structures having at least a portion of the normal underside thereof open, there being attachment means secured to the inner end of each arm which includes structure complementally received within a corresponding socket-defining structure.

4. The crossarm assembly of claim 3, wherein said pair of arms lie in a common, generally horizontal plane with said support means attached to said arms at the point of interconnection thereof.

5. The crossarm assembly of claim 4, wherein said support means is centrally disposed between said arms and lies in an upright plane which is substantially perpendicular to said common plane.

6. The crossarm assembly of claim 2, wherein said socket-defining structure is configured to present an elongated, laterally extending channel section which communicates with an outer, attachment means receiving section to permit lateral movement of the attachment means within said socket-defining structure.

7. The crossarm assembly of claim 6, wherein said outer section of said socket-defining structure comprises a rounded, ball-receiving cavity, and said attachment means comprises complementally configured ball means received within said cavity.

8. The crossarm assembly of claim 1, wherein said support means comprises an elongated strain member secured to said arm-defining means adjacent the outer end thereof for extending upwardly in an oblique orientation toward said pole.

9. The crossarm assembly of claim 8, wherein said means for attaching the upper end of said support means to the pole includes apparatus for permitting limited pivoting movement of the support means about separate perpendicular axes both transverse of the longitudinal axis of the support means.

10. The crossarm assembly of claim 1 wherein said line-supporting means is positioned adjacent the outer end of said arm-defining means.

11. The crossarm assembly of claim 1, wherein said arm-defining means and support means are formed of insulative material.

* * * * *